United States Patent [19]
Otsuki et al.

[11] Patent Number: 5,261,122
[45] Date of Patent: Nov. 9, 1993

[54] PORTABLE ELECTRONIC EQUIPMENT WITH SELECTIVELY REMOVABLE EXCHANGE PANEL AND CLIP

[75] Inventors: Susumu Otsuki, Yamato; Tetsuo Matsumura, Tokyo; Hideaki Yamazaki, Yokohama, all of Japan

[73] Assignee: Matsushita Electric Industrial Co., Ltd., Osaka, Japan

[21] Appl. No.: 711,015

[22] Filed: Jun. 6, 1991

[30] Foreign Application Priority Data

Jun. 11, 1990 [JP] Japan .................. 2-151963

[51] Int. Cl.⁵ .................. H04B 1/38; H04B 1/08
[52] U.S. Cl. .................. 455/90; 455/351; 224/252
[58] Field of Search .......... 224/252, 271, 272, 241, 224/151; 320/2, 3; 429/96, 97, 98, 99, 100; 455/89, 90, 100, 347, 348, 349, 351; 340/311.1

[56] References Cited

U.S. PATENT DOCUMENTS

| | | | |
|---|---|---|---|
| 4,206,274 | 6/1980 | Peels | 429/100 |
| 4,391,883 | 7/1983 | Williamson et al. | 429/100 |
| 4,635,836 | 1/1987 | Mooney et al. | 224/252 |
| 4,828,153 | 5/1989 | Guzik et al. | 224/252 |
| 4,853,302 | 8/1989 | Yamanaka et al. | 429/99 |
| 4,880,712 | 11/1989 | Gordecki | 429/100 |
| 4,956,895 | 9/1990 | Hayasaka | 224/252 |
| 5,081,709 | 1/1992 | Benyo et al. | 455/351 |

FOREIGN PATENT DOCUMENTS 1578490 11/1980 United Kingdom .
9008431 7/1990 World Int. Prop. O. .

OTHER PUBLICATIONS

Takemoto, et al, "A Fully Parallel 10-Bit A/D Converter with Video Speed," IEEE Journal of Solid-State Circuits, vol. SC-17, No. 6, pp. 1133-1138, Dec. 1982.

*Primary Examiner*—Curtis Kuntz
*Assistant Examiner*—Lisa Charouel
*Attorney, Agent, or Firm*—Stevens, Davis, Miller & Mosher

[57] ABSTRACT

A portable electronic equipment having a clip and an exchange panel which is adapted to be selectively fitted in a fitting groove formed on the rear surface of a housing incorporating a battery, a radio communication circuit, memory and the like, the clip or the exchange panel being releasably locked in the fitting groove, whereby the portable electronic equipment can be carried by being hooked on a belt or a pocket or clothes worn by a person with the use of the clip while it is held in a handbag or a pocket with the clip being removed and replaced with the exchange panel 3 Claims, 6 Drawing Sheets

PORTABLE ELECTRONIC EQUIPMENT WITH SELECTIVELY REMOVABLE EXCHANGE PANEL AND CLIP

BACKGROUND OF THE INVENTION

The present invention relate to a miniature portable electronic equipment.

DESCRIPTION OF RELATED ART

There has been known a portable electronic equipment, as shown in FIG. 4, having a clip 52 which is attached to the rear surface of a housing 51 and which is adapted to hook on a belt and a pocket of clothes worn by a person so as to prevent a portable electronic equipment from loosing or falling.

Further, with such a portable electronic equipment it is not only attached to a belt or a pocket of clothes with the use of the clip, but it is held in a handbag or a pocket without using the clip, particularly in such a case that the portable electronic equipment is used by a woman. In the latter case, the clip is not only necessary but becomes hampering. Further, in order to enable the portable electronic equipment to be used in both ways, that is, with and without the clip, two housings, with a clip and without a clip, should be prepared, and accordingly, it causes the cost thereof to rise up.

BRIEF SUMMARY OF THE INVENTION

One object of the present invention is to provide a portable electronic equipment which can be hooked on a belt or a pocket of clothes worn by a person with the use of a clip which can be removed when the portable electronic equipment is held in a handbag or a pocket, thereby it is possible to aim at reducing the cost thereof.

Further, the other object of the present invention is to provide a portable electronic equipment which prevents the clip from being unexpectedly removed, that is, the clip can be surely locked onto the housing.

To the end, according to a first aspect of the present invention, there is provided a portable electronic equipment comprising a housing in which an electronic circuit and a battery are disposed, a fitting groove formed in the housing; a clip and an exchange panel which are selectively fitted in the fitting groove, engaging means provided on both side edges of the clip and the exchange panel, for slidably engaging the clip and the exchange panel in the fitting groove; and a locking means adapted to releasably lock the clip and the exchange panel in the fitting groove.

According to a second aspect of the present invention, in addition to the first aspect of the present invention, locking protrusions for releasing the locking means are formed on the rear surface of each of the clip and the exchange panel.

According to a third aspect of the present invention, in addition to the first and second aspects of the present invention, the clip and the exchange panel adapted to be selectively fitted in the fitting groove, and locked by a battery lid which is rotatably attached and releasably locked to the housing.

With this arrangement, according to the present invention, since the clip is fitted in the fitting groove in the housing by the engaging means and is locked therein by the locking means, the portable electronic equipment can be held being hooked on a belt or a pocket of clothes worn by a person. Meanwhile, since the exchange panel can be fitted in the fitting groove, instead of the clip, and since it is locked in the fitting groove by the locking means, the portable electronic equipment can be held in a handbag or a pocket without the clip which is hampering in this case.

Further, the clip and the exchange panel can be removed smoothly by use of a special releasing tool which is inserted in a gap on the rear surface side of the clip or the exchange panel so as to release the locking means.

Further, since the clip or the exchange panel is fitted and locked in the fitting groove in the housing, and is further locked by the battery lid which is also locked to the housing, the clip and the exchange panel can be held in the housing with a high degree of reliability.

These and other objects, and advantages as well as features of the present invention will be more apparent from the description of a preferred embodiment which will be hereinbelow explained with reference to the accompanying drawings, in which:

BRIEF DESCRIPTION OF THE DRAWINGS

FIGS. 2a and 2b are sectional views illustrating a battery lid section of the equipment shown in FIG. 1, among which FIG. 2a shows such a condition that the battery lid is opened, and FIG. 2b shows such a condition that the battery lid is closed.

FIGS. 3a and 3b sectional views illustrating a groove section shown in FIG. 1, among which FIG. 3a shows such a condition that a clip or an exchange panel is fitted in the groove while a releasing tool being not inserted, and FIG. 3b shows that the clip or the exchange panel is partly raised by the releasing tool inserted;

DESCRIPTION OF THE PREFERRED EMBODIMENT

Figure 1:
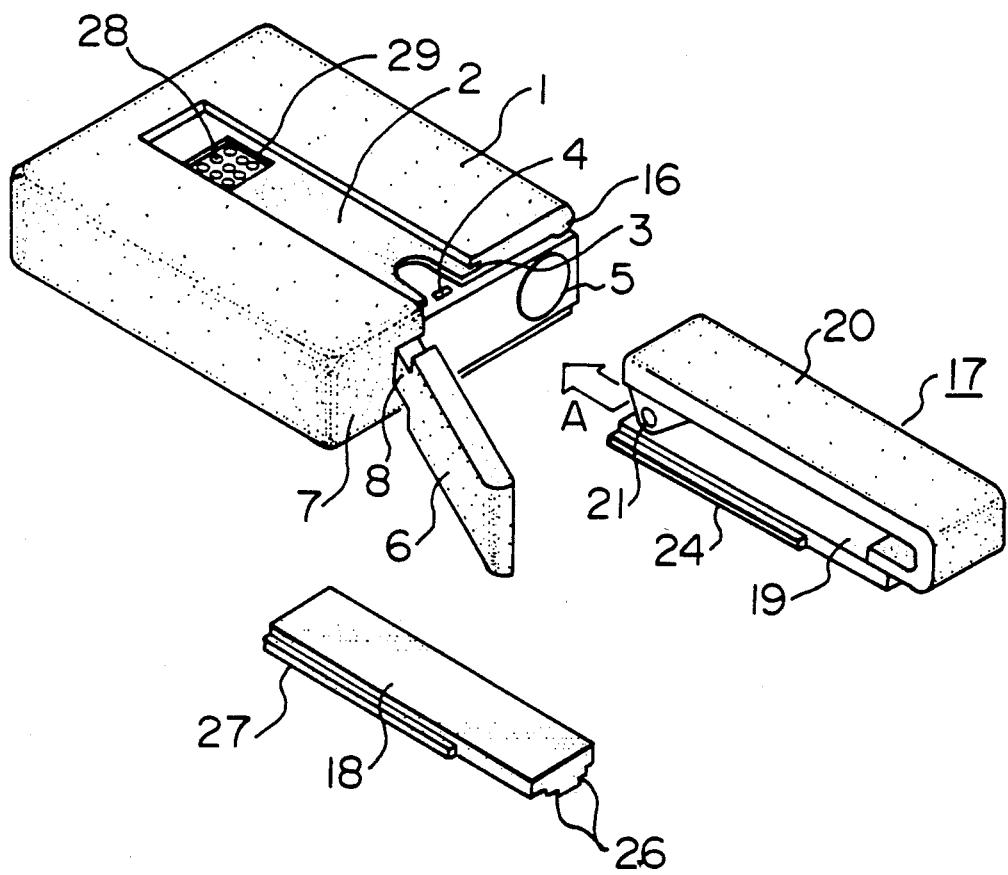
FIG. 1 is a perspective view illustrating a portable electronic equipment in one embodiment form of the present invention.

Referring to FIGS. 1 to 3, an fitting groove 2 is formed in the center part of the rear surface of a housing 1, and is formed at its both longitudinal side walls with engaging grooves 3. The fitting groove 2 is opened at one end part of the housing 1 so as to define an opening through which a clip 17 or an exchange panel 18 which will be explained latter can be introduced into the fitting groove 2. The bottom part of the fitting groove 2 is deeply cut so as to form a recess in the vicinity of the opening of the groove 2, and a locking hole 4 is formed on the bottom of the groove 2 within the recess. A battery lid 6 which is adapted to open and close a battery storage chamber 5 and the opening of the fitting groove 2 is attached to the one end part of the housing 1. More specifically, one side part of the one end part of the housing 1 is formed therein with a cutout 8 which defines therein a journal section having first and second journal parts 9, 10 which are opposed to each other through a space 11 within the journal section. The space 11 is narrower than the journal parts 11 since a partition projection wall 12 is formed therein. This partition projection wall 12 is formed therein with slits 13 which give a resiliency so that the partition projection wall 12 can be resiliently retracted. A shaft part 14 formed on the proximal end part of the battery lid 6 is rotatably supported by the first journal part 9, and can be displaced between the first and second journal parts 9, 10 by way of the space 11 while the partition projection wall 12 being forced to be retracted. An engaging protrusion 15 is formed at the inner side of the free end part of the battery lid 6, and an engaging cutout 16 is formed in the one end part of the housing 1 on the side remote from the cutout 8. Accordingly, when the battery lid 6 is pushed after being closed so that the shaft 4 is displaced from the journal part 9 to the journal part 10, the engaging protrusion 15 is fitted in the engaging cutout 16 so as to firmly lock the battery lid 6.

A clip 17 and an exchange panel 18 can be selectively fitted in the above-mentioned fitting groove 2. The clip 17 has a clip member 20 having a hook-like part at its distal end and rotatably journalled at its proximal end to one short side part of a base plate 19 by means of a shaft 21, and the distal end part of the clip member 20 is urged against the base plate 19 by a coil spring (which is not shown) and is therefore made into close contact with the latter. Accordingly, the clip member 20 can be rotated about the shaft 21, overcoming the resilient force of the coil spring so as to be displaced away from the base plate 19. A locking projection 22 is formed integrally with the rear surface of the base plate 19 at a position corresponding to that of the locking hole 4, in the distal end part of the clip member 20. Further, low height releasing protrusions 23 are formed integrally with the rear surface of the base plate 19 on both sides of the locking projection 22. The base plate 19 has engaging ridges 24 adapted to be engaged in the engaging grooves 3, and integrally formed on both long side faces of the base plate 19. These engaging ridges 24 are cut intermediately so that they do not reach positions near the locking projection 22. It is noted here that the dimensions of the ridges and the grooves 3 are so selected that the locking projection 22 side part of the base plate 19 can be elastically deformed so as to be curved with the ridges 24 being engaged in the grooves 3 (refer to FIG. 3b). The exchange panel 18 is also adapted to be fitted in the fitting groove 2, being flush substantially with the rear surface of the base plate 19, and is integrally formed thereon with a locking projection 25 and releasing protrusions 26 similar respectively to the locking projections 22 and the releasing protrusions 23, on one short side part thereof. Further, engaging ridges 27 similar to the engaging ridges 24 of the clip 17 are also formed integrally with the long side faces of the exchange panel 18.

Figure 7:
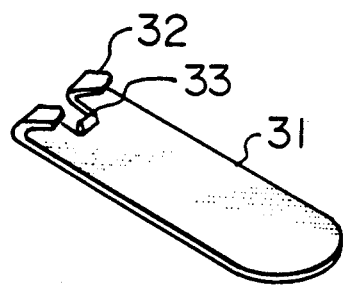
FIG. 7 is a perspective view illustrating the releasing tool shown in FIGS. 3a or 3b.

The locking projection 22 or 25 of the clip 17 or the exchange panel 18 are released from the locking hole 4 in the housing 1 by use of a releasing tool 31 which is clearly shown in FIG. 7, having engaging protrusions 32 at its front end part and made of resilient materials and bent in a V-like shape.

Figure 3A:
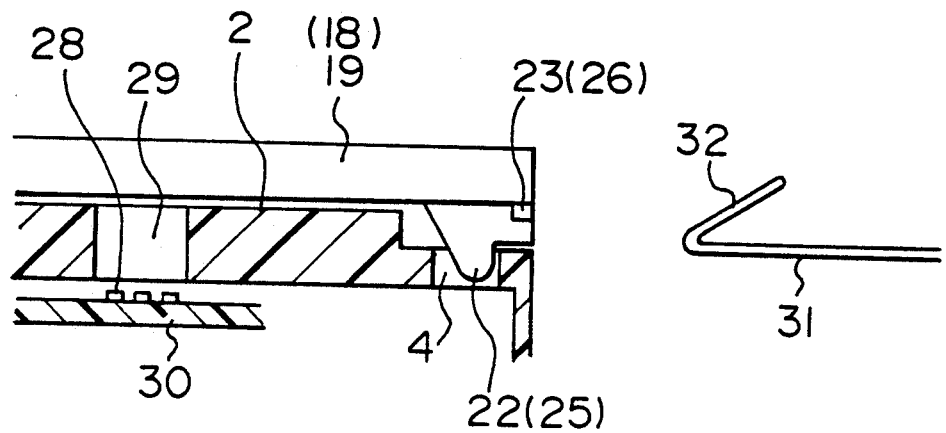
Figure 3B:
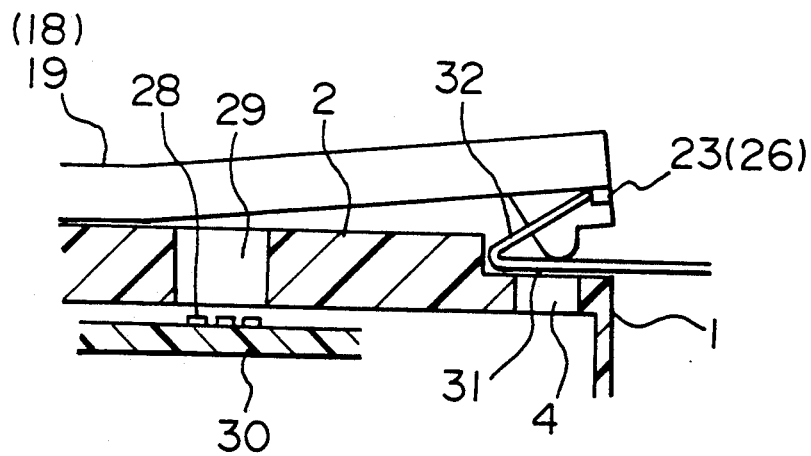
Figure 4:
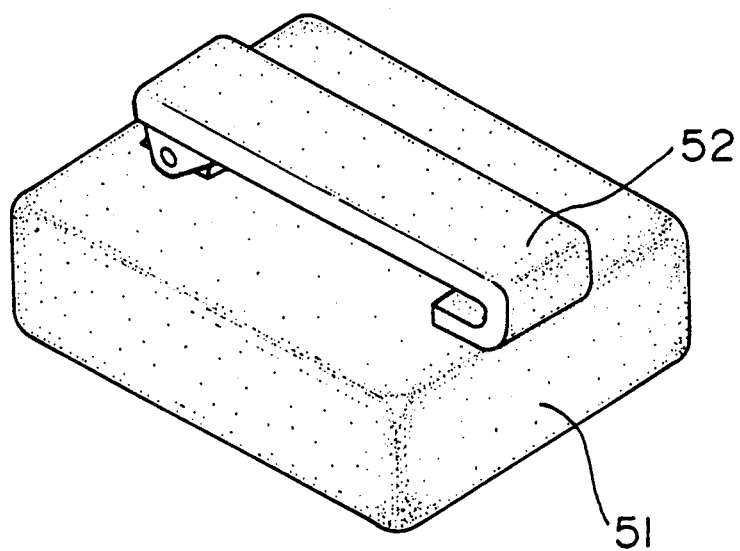
FIG. 4 is a perspective view illustrating a conventional portable electronic equipment.
Figure 6:
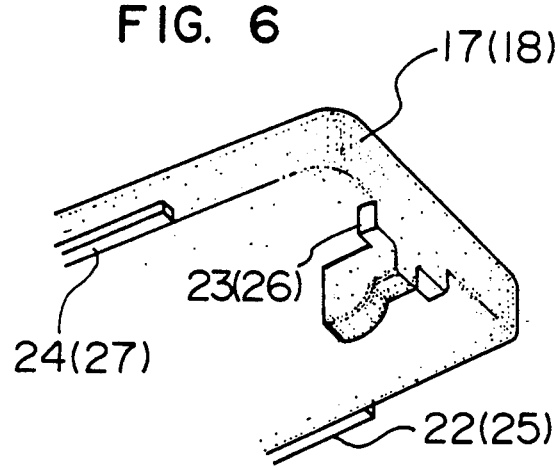
FIG. 6 is a perspective view illustrating the essential part of the clip or the exchange panel.

Referring to FIGS. 3a and 3b together with FIGS. 6 and 7, explanation will be made of the use mode of the portable electronic equipment.

Figure 2A:
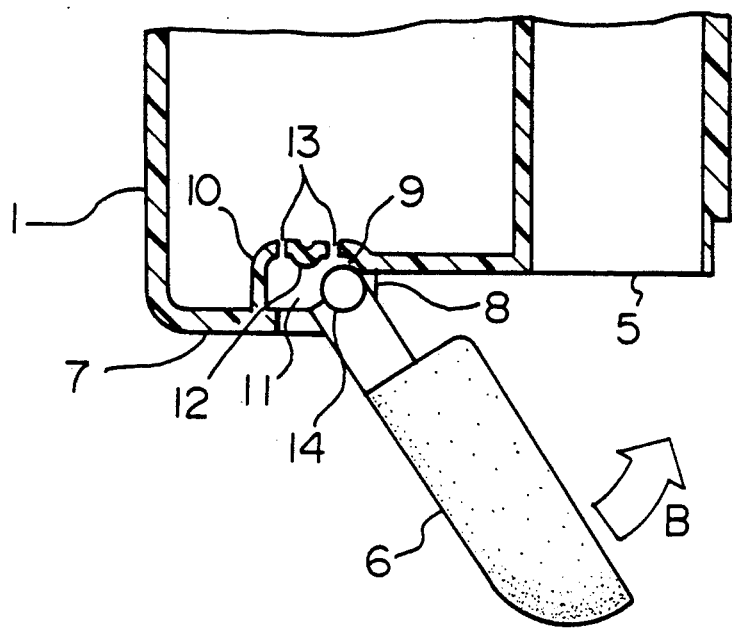
Figure 2B:
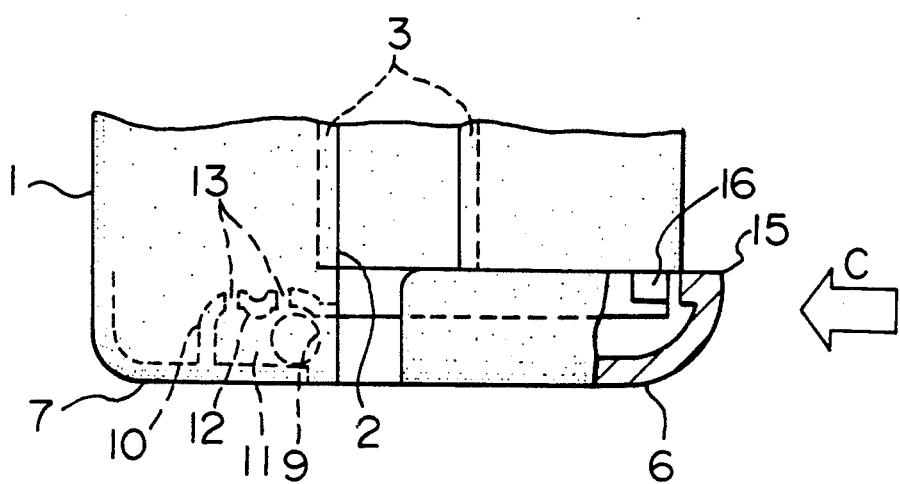

In the case of use of the portable electronic equipment attached on a belt or a pocket of clothes worn by the user, after the battery lid 6 being opened, the engaging ridges 24 of the base plate 19 are fitted in the engaging grooves 3 through the opening of the fitting groove 2, and is then slid along the grooves 3 in the direction of the arrow A until the clip 17 is fully fitted in the fitting groove 2. Since the ridges 24 are not completely extended to positions near to the locking projection 22, the locking projection 22 can override the end part of the housing 1 due to an elastic deformation of the base plate 19 on the projection 22 side thereof. That is, as clearly shown in FIG. 3a, the projection 22 is adapted to be engaged into the locking hole 4. With this arrangement, the base plate 19 of the clip 17 fitted in the fitting groove 2 can be locked. Thereafter, as shown in FIG. 2a, the battery lid 6 is turned in the direction of the arrow B about the shaft 14 supported on the first journal part 9, and is then pushed in the direction of the arrow C as shown in FIG. 2b. On the way of this displacement through the space 11 from the first journal part 9 to the second journal part 10, a click feeling can be given by the partition projection wall 12, and is then supported by the second journal part 10. Meanwhile, the engaging protrusion 15 is engaged and locked in the engaging cutout 16. The locked battery lid 6 abouts against the end face of the distal end part of the clip member 20 on the base plate 19 of the clip 17 so as to limit the displacement of the clip 17, and accordingly, the clip 17 is surely locked. Accordingly, the portable electronic equipment can be attached to the belt or the pocket by means of the clip member 20.

Meanwhile, in the case of the portable electronic equipment being held in a handbag, a pocket of clothes or the like, at first the battery lid 6 is pulled in the direction reverse to the direction of the arrow C, and then the shaft 14 supported by the second journal part 10 is shifted through the space 11 to the first journal part 9 while deforming the partition projection wall 12 and is then held thereby. Accordingly, the engaging protrusion 15 is disengaged from the engaging cutout 16 so that the battery lid 6 is released. Then, the battery lid 6 is turned about the shaft 14 in the direction reverse to the direction of the arrow B as shown in FIGS. 1 and FIG. 2a. Further, when the forward end part of the releasing tool 31 is inserted between the bottom part of the opening of the fitting groove 2 and the releasing protrusions 23 by use of a resilient deformation of the engaging projection 23, the locking protrusion 22 side of the base plate 19 of the clip 17 is elastically deformed and curved due to the repulsive resiliency of the locking parts 32. A protrusion 33 formed between the locking parts 32 is a stopper which abuts against the front side of the locking protrusion 22 so as to stop the releasing tool 31 in position. Accordingly, the locking projection 22 is disengaged from the locking hole 4, that is, the clip 17 is released. In this condition, since the front end parts of the locking parts 32 are engaged with the inside of the releasing protrusion 23, if the releasing tool 31 is pulled out, the engaging ridges 24 of the clip 17 are slid along the engaging grooves 3 in the housing 1, and accordingly, the clip 17 is removed from the fitting groove 12. Then, the exchange panel 18 is fitted in the fitting groove 2. similar to the installation of the clip 7. More specifically, the engaging ridges 27 of the exchange panel 18 are inserted in the engaging grooves 3 in the housing 1 through the opening of the fitting groove 12, and then the engaging ridges are slid along the engaging grooves 3 in the housing 1 until the exchange panel 18 is fully fitted in the fitting groove 12. Since the engaging ridges do not reach positions near to the locking protrusion 25, the locking protrusion 25 can override the end part of the housing 1 and then engages into the locking hole 4 as shown in FIG. 3a. Accordingly, the exchange panel 8 can be fitted and locked in the fitting groove 2. Thereafter, the battery lid 6 is turned in the direction of the arrow B as shown in FIG. 2a, and is then shifted in the direction of the arrow C in order to be locked. Thus, the exchange panel 8 can be surely locked, as mentioned above. Accordingly, the clip 7 which becomes obstructive when the portable radio equipment is stored in a handbag or a pocket can be removed.

The removal of the exchange panel 18 from the housing 1 can be made, similar to that of the clip 17, and accordingly, the explanation thereof is omitted.

Since the clip 7 or the exchange panel 18 can be held in the fitting groove 12 in the housing 1 under locking condition when the battery lid 6 is opened so as to replace batteries, there is no risk of missing of the clip 7 or the exchange panel 18. Further, since the clip 7 or the exchange panel 18 can be removed only by use of the special releasing tool 13, it is difficult for third party to remove the clip 7 or the exchange panel 18. Reference numeral 28 denotes terminals on a board 30 (see FIGS. 3a and 3b). Terminals 28 are visual via opening 29.

Although the embodiment of the present invention has been detailed, the present invention should not be limited to this embodiment, but can be changed or modified therefrom within the spirit and the scope of the invention which can be only limited by the appended claims.

For example, the engaging grooves 3 can be formed in the base plate 19 of the clip 17 or the exchange panel 18 while the engaging ridges 24, 27 can be formed on the side walls of the fitting groove 2 in the housing 1.

Figure 8A:
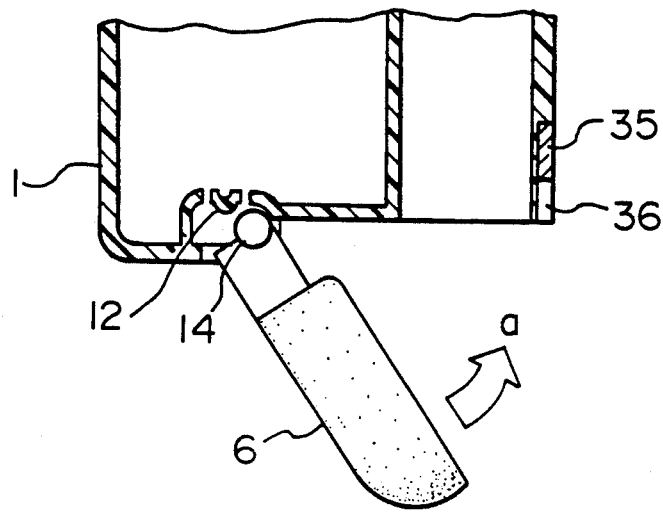
FIGS. 8a and 8b are sectional views illustrating the battery lid section of the housing, corresponding to FIGS. 2a and 2b.
Figure 8B:
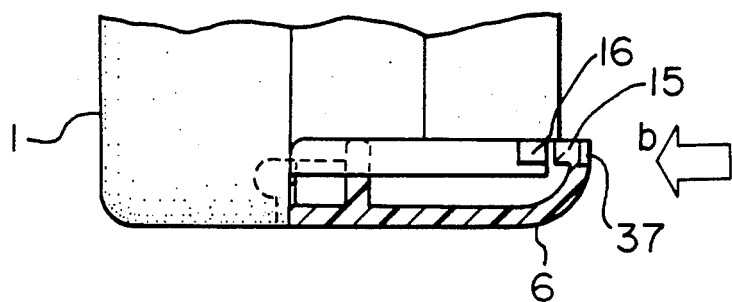
Figure 8C:
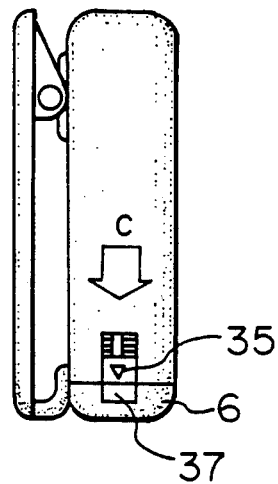
FIG. 8c is a side view illustrating the portable electronic equipment with the clip being fitted thereon, in which the battery latch plate is clearly seen.

Further, in order to further ensure the locking of the clip 17 or the exchange panel 18 in the fitting groove 2 in the housing 1, it is preferable to use a battery lid locking mechanism as shown in FIGS. 8a to 8c. That is, a latch plate 35 is slidably fitted in a shallow groove 36 formed in the side surface of the housing 1 on the side where the distal end face of the battery lid 6 is positioned when the latter is closed. Further, the distal end face of the lid is formed therein with a shallow groove 37 which is aligned with the shallow groove 36 when the lid 6 is closed.

When the lid 6 is closed, the latch plate 35 is shifted toward the distal end part of the lid 6 so as to be extended between both grooves 36, 37, and accordingly, the lid 6 is firmly locked. Accordingly, this can, in turn, firmly lock the clip 17 or the exchange panel 18 fitted in the fitting groove 12.

Figure 5:
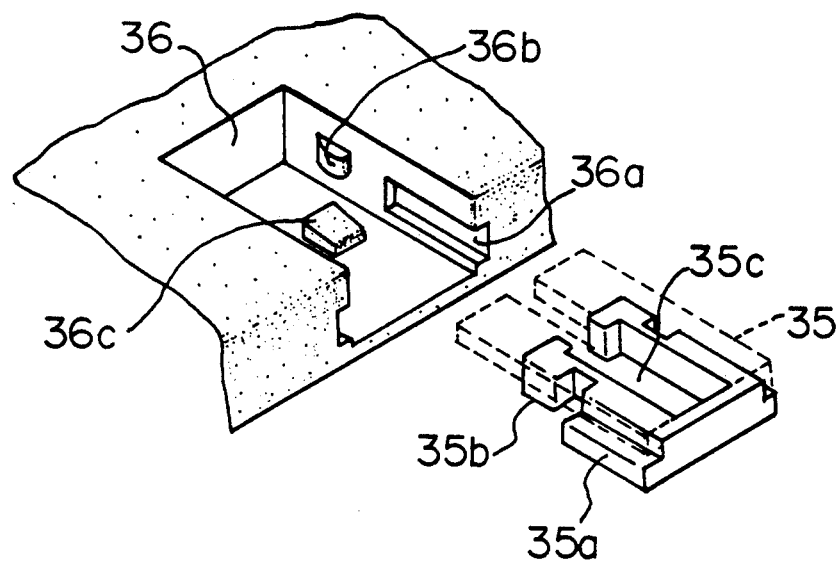
FIG. 5 is a perspective view illustrating a lid locking groove formed in a housing shown in FIG. 1 and a latch plate whose main body or cover section is shown by the chain line.

The structures of the latch plate 35 and the shallow groove 36 are clearly shown in FIG. 5. Engaging ridges 35a formed on both side surfaces of the base of the latch plate 35 are engaged slidably in engaging grooves 36a formed in the side walls of the shallow groove 36. When the latch plate 35 is fitted in the shallow groove 36, a cutout 35c formed in the base 35b of the latch plate 35 receives a raised part 36c formed on the bottom surface of the shallow groove 36 while recessed parts formed in both side surfaces of the base being fitted onto protrusions 36b formed on the side walls of the shallow groove 36. With this arrangement, the latch plate 35 can be prevented from coming off from the housing 1.

What we claim is:

1. A portable electronic equipment comprising:
   a housing incorporating therein a radio communication circuit, a memory, and a battery and having a rear surface, a front end face and a side face;
   a fitting groove formed in said rear surface of said housing so as to be opened at the front end face of said housing and having side walls and a bottom part;
   a battery lid rotatably mounted on the front end face of said housing, for closing an opening of a battery storage space in said housing;
   a clip and an exchange panel which are adapted to be selectively fitted in said fitting groove, each having opposite side surfaces;
   engaging means formed on said opposite side surfaces of each of said clip and said exchange panel and on said side walls of said fitting groove, for slidably engaging said clip or said exchange panel in said fitting groove; and
   locking means provided on each of said clip and said exchange panel and on said housing, for releasably locking said clip or said exchange panel in said fitting groove.

2. A portable electronic equipment as set forth in claim 1, further comprising at least one releasing protrusion, for releasing said locking means, formed on each of said clip and said exchange panel.

3. A portable electronic equipment as set forth in claim 1 wherein said clip or said exchange panel which is selectively fitted in said fitting groove is further locked by said battery lid when the latter is closed.

* * * * *